(12) United States Patent
Olive et al.

(10) Patent No.: US 9,457,507 B2
(45) Date of Patent: Oct. 4, 2016

(54) THIN FILM MIRROR

(75) Inventors: Graham Olive, Crawley (GB);
Graham Barnes, Cuckfield (GB);
Henry Nicholson-Cole, Poole (GB)

(73) Assignee: L-3 Communications Link Simulation and Training UK Limited, London (GB)

( * ) Notice: Subject to any disclaimer, the term of this patent is extended or adjusted under 35 U.S.C. 154(b) by 254 days.

(21) Appl. No.: 14/115,861

(22) PCT Filed: May 4, 2012

(86) PCT No.: PCT/GB2012/050993
§ 371 (c)(1),
(2), (4) Date: Nov. 5, 2013

(87) PCT Pub. No.: WO2012/150470
PCT Pub. Date: Nov. 8, 2012

(65) Prior Publication Data
US 2014/0125959 A1    May 8, 2014

(30) Foreign Application Priority Data

May 4, 2011   (GB) .................................. 1107463.0

(51) Int. Cl.
*G02B 7/182*   (2006.01)
*B29C 51/10*   (2006.01)
(Continued)

(52) U.S. Cl.
CPC ......... *B29C 51/10* (2013.01); *B29D 11/00596* (2013.01); *G02B 5/0808* (2013.01); *G02B 5/10* (2013.01); *G02B 7/182* (2013.01);
(Continued)

(58) Field of Classification Search
CPC .... G02B 5/10; G02B 7/182; G02B 26/0825; G02B 5/08; G02B 27/62; G09B 9/08; G09B 9/30; G09B 9/32; B60R 1/088
USPC .......... 359/846, 847, 848, 871, 872; 434/38, 434/40
See application file for complete search history.

(56) References Cited

U.S. PATENT DOCUMENTS

| | | |
|---|---|---|
| 5,226,816 A | 7/1993 | Hawkins |
| 6,113,242 A | 9/2000 | Marker et al. |
| 7,708,561 B2 * | 5/2010 | Ponder .................... G09B 9/32 434/40 |

FOREIGN PATENT DOCUMENTS

| | | |
|---|---|---|
| DE | 26 31 551 | 2/1978 |
| DE | 101 60 523 | 10/2002 |

(Continued)

OTHER PUBLICATIONS

GB Search Report for GB Application No. 1107463.0 prepared by Intellectual Property Office of United Kingdom, mailed Sep. 2, 2011. (3 pages).

(Continued)

*Primary Examiner* — Euncha Cherry
(74) *Attorney, Agent, or Firm* — Haynes and Boone, LLP

(57) ABSTRACT

A thin film mirror, comprising: a mirror shell (605); a reflective film (601) stretched between forming structures (603) provided on said mirror shell and reflective film being arranged such that they form a chamber which is capable of being placed under at least partial vacuum; the mirror shell having an inner surface which forms an inner wall of said chamber, wherein the mirror shell is a moulded part where its inner surface is a controlled surface.

22 Claims, 9 Drawing Sheets

(51) Int. Cl.
  *G02B 5/08* (2006.01)
  *G02B 5/10* (2006.01)
  *G02B 26/08* (2006.01)
  *G09B 9/32* (2006.01)
  *B29D 11/00* (2006.01)
  *G03B 21/14* (2006.01)

(52) U.S. Cl.
  CPC ......... *G02B26/0825* (2013.01); *G03B 21/142* (2013.01); *G09B 9/32* (2013.01)

(56) References Cited

FOREIGN PATENT DOCUMENTS

| EP | 0 152 268 | 8/1985 |
|---|---|---|
| EP | 1 376 193 | 1/2004 |
| GB | 380473 | 9/1932 |
| GB | 2165182 | 4/1986 |
| GB | 2368142 | 4/2002 |
| WO | WO 88/02126 | 3/1988 |
| WO | WO 2007/007024 | 1/2007 |

OTHER PUBLICATIONS

Written Opinion of the International Searching Authority for PCT/GB2012/050993 prepared by ISA/EP, mailed Jul. 18, 2012. (6 pages).

International Search Report for PCT/GB2012/050993 prepared by ISA/EP, mailed Jul. 18, 2012. (5 pages).

European examination report for EP Patent Application No. 12722187.7 dated Mar. 26, 2015 (4 pages).

\* cited by examiner

THIN FILM MIRROR

The present invention is concerned with the field of mirrors which have a thin reflective film provided over a mirror shell and formed into a desired shape by the application of a partial vacuum.

In flight simulators which use an Out The Window (OTW) Visual Display System (VDS), a collimating optical mirror is provided around a replica of an aeroplane cockpit such that a user can only see the mirror through the windows of the cockpit. An image of what the user should see out of the cockpit window is then viewed via the mirror.

A large mirror is required, and hence a standard glass mirror will be, in most cases, too heavy. Therefore, the industry uses a reflective film, usually biaxially-oriented polyethylene terephthalate (boPET), stretched across a mirror shell and sucked back to have a substantially spherical or toroidal profile by a closed loop vacuum control system. This type of system can provide a user with an uninterrupted seamless field of view of in excess of 200 degrees horizontally by 45 degrees vertically. The mirror and its associated structures, screens and projectors need to be lightweight and yet able to withstand the acceleration and vibration loads induced by the simulator motion system without dynamic degradation of the mirror's profile.

The above type of thin film mirrors suffer from problems such as the film does not maintain the required profile in a border region adjacent to its edges where it attaches to the shell. Further, existing manufacturing techniques require many extra components to improve the geometry of the mirror.

Proposed solutions to the above problems have included applying a lateral edge tension to the reflective film as described in WO97115847 or providing an extra tensioning mechanism as described in GB2368142 which applies indirect lateral tension via the application of perpendicular pressure. However, the application of perpendicular pressure has the unwanted side effect of deforming the reflective film surface resulting in unwanted optical artefacts (known as festooning or waviness) giving rise to a "hall of mirrors" effect when the observer moves his head around.

The present invention attempts to at least partially address the above problems and in a first aspect provides a thin film mirror, comprising:
a mirror shell;
a reflective film stretched between forming structures provided on said mirror shell and reflective film being arranged such that they form a chamber which is capable of being placed under at least partial vacuum;
the mirror shell having an inner surface which forms an inner wall of said chamber, wherein the mirror shell is a moulded part where its inner surface is a controlled surface.

The mirror shells of known thin film mirrors are constructed using a moulding technique using a female mould. The use of a female mould means that the convex outer surface of the mirror shell was provided against the mould during manufacture. Those skilled in the art of moulding techniques refer to the surface of an object which is formed next to the mould during the moulding process as the "controlled surface" or the "A" surface. The surface which is away from the mould is referred to as the "B" surface. One skilled in the art would be able to easily identify which was the "A" surface or controlled surface and which was the "B" surface in an object after removal of the mould from the object. The "A" surface will be reproducible, such that it will be largely identical for each shell formed from the same mould. Any forming structures provided using the moulding process on the "A" surface will be of a high precision that defines the optical quality of the mirror whereas the outer surface is purely cosmetic in its finish. Further, the "A" surface may have a colour or other surface applied using a "gelcoat" technique or the like.

It is also possible to use a so-called closed mould. Here, both the inner surface and the outer surface will lie against the mould during moulding. Both surfaces will be controlled.

Also, the "A" surface will have a precise profile. It is harder to control the profile of the "B" surface. Further, it is difficult to position or precisely define features on the "B" surface during the moulding process. However, it is possible to precisely position features on the B-surface by machining the features after moulding.

By using a male mould, as opposed to the conventional female mould, it is possible for the inner surface of the mirror chamber to be formed against the mould and hence be the "A" surface. This has many advantages as the precise profile of the inner surface can be controlled. Further, the smoothness of the "A" surface produced means that it needs little, if any, post processing.

A further significant advantage of the use of a male mould and thus making the inner surface of the mirror the "A" surface is that features, such as protrusions (required for optical qualities), can be precisely defined, sized and positioned, since such features can be defined, sized and positioned using a computer numerical control cutting tool (CNC) during manufacture of the mould.

When the reflective film is attached to the mirror shell, the reflective film contacts the mirror shell at edges provided on the mirror shell. These edges are known as the forming edges or structures and the area bounded by the forming structures defines the mirror. The forming structures around the edges of the mirror shell need to be sized and positioned with great accuracy.

Also, by precisely defining the forming structures during the moulding process, it is possible to ensure that there is a small gap between the thin film (when in its operational position) and the inner surface of the shell.

One current method of making the forming structures uses separate metal or composite components which are precisely positioned on the mirror shell after it has been moulded.

A further known method of making the forming structures uses a female mould with removable features, parts or sub-moulds which allow a ridge to be formed at the edge of the inner surface of the shell. These sub-moulds have to be prepared, fitted and removed which increases the expense and complexity of the manufacturing process.

If the mirror shell is formed using a male mould, then the forming structures can be formed at the moulding stage by providing a suitably shaped recess or groove in the mould. Therefore, in an embodiment, the said protrusion runs along at least a part of the said edge to provide a forming structure for said reflective film, said forming structure being an edge which defines at least part of the boundary of said reflective film.

This ability to provide the forming structures during the moulding of the mirror shell and integral with the mirror shell provides a simplified manufacturing technique over those requiring the formation of a mould with removable features/submould or which require the forming structures to be attached to the shell after moulding. Also attaching structures to the shell will increase the weight of the mirror. Further, the use of the different material for the forming structures causes difficulty in that the forming structures will be comprised of a material that has a different thermal coefficient and thus expansion properties to those of the shell.

Further, by using the male mould, it is possible to form protrusions or ridges on the inner surface of the mirror shell which are spaced in from the edge of the mirror shell. Further, these protrusions or ridges will comprise the same material as the shell.

The thin film which is used to form the mirror is attached to the shell. Typically, the thin film will be provided on a roll and a sheet of the thin film is dispensed from the roll and attached the mirror. The top and bottom forming edges of the shell typically have dissimilar radii and the roll width is generally of insufficient width, when the film is attached to the shell, for the film to fully extend to the corners of the edge with the smaller radii which is typically the bottom edge of the shell. To address this issue, protrusions are usually provided on the internal surface of the mirror shell at a position to allow the edges of the thin film to be attached. In shells in accordance with embodiment of the present invention, the protrusions which are used to contact or attach the film at its edges can be integrally moulded with the remainder of the mirror shell.

As the above protrusion is integrally moulded with the mirror shell, it can be precisely positioned as its position can be defined on the male mould. Precise positioning of the protrusion is necessary as errors in its position can affect optical performance of the mirror. Providing this protrusion as a separate component adds extra mass and an extra layer of complexity to the formation of the mirror shell.

In a second aspect, the present invention provides a thin film mirror, comprising:
 a mirror shell;
 a reflective film stretched between forming structures provided on said mirror shell and reflective film being arranged such that they form a chamber which is capable of being placed under at least partial vacuum;
 the mirror shell having an inner surface which forms an inner wall of said chamber, wherein the mirror shell is a moulded part where its inner surface comprises one or more protrusions spaced in from an edge of said mirror shell.

In a yet further embodiment, the mirror shell comprises a protrusion in the form of a ridge which is spaced in from the edges of mirror, said ridge providing a secondary forming structure for said mirror.

In one embodiment, the thin film is laterally tensioned before it is finally attached to the mirror shell.

The mirror may also comprise tensioning means which provides a force perpendicular to the reflective film in the region between the edge of the mirror shell and the secondary forming structure of the mirror. The perpendicular force in this region will result in the pulling of the reflective film over the secondary forming structure and hence a lateral force on the reflective film.

Further, the secondary forming structure provides a breakwater type structure which prevents festooning or waviness formed in the film at its edges from extending into the region of the film bounded by the secondary forming structures.

Even in the absence of a tensioning means, the secondary forming structure is beneficial. If the thin film is correctly tensioned before the application to the shell, there is no need for the tensioning means. However, even in this situation, there may be slight waviness at the edges of the thin film as the secondary forming structure prevents this waviness from extending into the centre of the mirror.

The above at least partially address the issues of festooning and waviness reported in other tensioning methods.

The formation of this secondary forming structure is greatly helped by the use of a male mould which allows the protrusion which provides the secondary forming structure to be precisely defined, positioned and sized. However, such a secondary forming structure could be retro-fitted onto existing mirrors and thus, in a third aspect, the present invention provides a thin film mirror, comprising:
 a mirror shell;
 a reflective film stretched between forming structures provided on said mirror shell and reflective film being arranged such that they form a chamber which is capable of evacuation;
 the mirror shell having an inner surface which forms an inner wall of said chamber and further comprising a protrusion in the form of a ridge which is separated from the edges of mirror, said ridge providing a secondary forming structure for said reflective film, said secondary forming structure being provided spaced apart from an edge of the mirror shell with a forming structure, said secondary forming structure contacting said reflective film.

In one embodiment, the mirror shell will comprise a primary forming structure and a secondary forming structure, the secondary forming structure being spaced in from the primary forming structure. The primary forming structure forming a continuous boundary for the mirror film. In an embodiment, the secondary forming structure will also be continuous. However, in other embodiments there are gaps in the secondary forming structure. In some further embodiments, the secondary forming structure will comprise upper and lower sections where the upper section is spaced in from the upper edge and the lower section is spaced in from the lower edge. However, in some further embodiments, the secondary forming structure may not be present spaced in from the side edges. The term continuous here is intended to mean that there are no gaps in the boundary or forming structures. However, in some embodiments, corners may be provided in the forming structures or boundaries.

The ability to precisely define, position and size protrusions spaced in from the edges has other advantages. For example, it is possible to use one mould to manufacture mirrors of different sizes. Thus, in a further embodiment, the mirror shell further comprises at least one ridge on its inner surface, said reflective film contacting said ridge such that said ridge defines the angular extent of the mirror.

In an embodiment, the mirror shell has the shape of a part of a substantially spherical shell or part of a toroid. In a further embodiment, the mirror shell has an upper edge part and a lower edge part, wherein the upper edge part and lower edge parts substantially follow different small circles where the planes of the small circles are parallel to one another. In a further embodiment, the planes of the small circles of the top and bottom edges are not parallel to one another. Also, the top and bottom edges may also not follow small circles.

In an embodiment, the mirror shell subtends through an angle of at least 180°. In such an arrangement, the mirror shell may comprise two sections joined together, wherein each section subtends through an angle of 180° or less.

In an embodiment, the mirror shell comprises a thermoset composite for example, a fibre reinforced plastic (FRP). Resin systems such as polyester, vinylester or epoxy can be used and these may be reinforced with fibres such as glass (to form glass reinforced plastic (GRP)), carbon or aramid. In a further embodiment, the mirror shell comprises a composite with a lower density core. For example, the core may be made out of foam, honeycomb, balsa.

In a further embodiment, the core is a thermoformable structural foam core. In one embodiment, the core is shaped to curve over the inner surface of the shell. Forming the core in this manner allows the foam to be moulded and curved in two directions of curvature.

In a further aspect, the present invention provides a method of making a thin film mirror, said method comprising:
forming a mirror shell;
fixing a reflective film to said mirror shell, such that a chamber is formed between said reflective film and mirror shell, said chamber being capable of being placed under at least partial vacuum,
wherein forming said mirror shell comprises moulding said mirror shell using a male mould.

In an embodiment, the method further comprises forming the mould. In a further embodiment, the mould is formed using a computer numerical cutting tool.

In a further embodiment, the mould is formed with at least one groove, such that when the mould is used to mould a shell, at least one forming structure is formed on a surface of said mirror shell which is adjacent said mould during the moulding process.

In a yet further embodiment, a groove is formed in said mould which is spaced apart from the edge of said mould, such that a secondary forming structure is provided on said mirror shell, said secondary forming structure being spaced apart from the edge of said mirror shell, such that the reflective film contacts the secondary forming structure. A tensioning means being provided to apply pressure on the region of film between the secondary forming structure and a forming structure on a nearest edge of the mirror shell to the secondary forming structure, such that pressure applied in the region of film causes the operational region of film to be laterally tensioned.

In a yet further embodiment, a plurality of grooves are formed in the mould, said grooves being positioned at different lateral positions of the mould. In a yet further embodiment, the method comprises filling one or more of the grooves such that the innermost unfilled groove defines the lateral extent of the mirror to be formed, said filling comprising filling the one or more grooves with a filler which is removable. The grooves can be filled with a loose tooling fixture. The loose tooling fixture can be removed or reapplied dependent on the size of the mirror required.

Grooves may be provided at the side corners of the mould in order to accommodate the shape of the thin film which is typically rectangular and has a limited width.

In a further aspect, the present invention provides a mould for a shell of a thin film mirror, the mould being a male mould having an outer surface with one or more sections which have a profile which is substantially spherical or toroid, the mould having at least one groove formed along an edge of the sections with the spherical or toroidal shapes.

In an embodiment, the sections of the mould with the substantially spherical or toroidal profile have an upper edge part and a lower edge part, wherein the upper edge part and lower edge parts substantially follow different small circles where the plane of the small circles are parallel to one another. The sections of the mould with the substantially spherical or toroidal profile further comprise side edge parts which complete the edge of the said sections.

In a further embodiment, the mould is provided with a series of grooves closely positioned at varying distances from the side edges of the sections of the mould with the substantially spherical or toroidal profiles. In a yet further embodiment at least one of these grooves is filled with a loose tooling fixture, said filler being of a type which is removable from the grooves.

In a further embodiment, the mould is provided with a secondary groove provided spaced apart from a groove provided around the edges of the mould.

In a yet further embodiment, grooves are provided on the mould to allow for forming structures to be provided allowing the rectangular shape of the film to be fixed to the substantially spherical or toroidal profile of the inner surface of the mirror shell.

In one embodiment, the mould is in a single piece and is configured such that the mirror shell is formed in two sections on the mould. In a further embodiment, a keystone is provided in the mould which can be removed from the mould. Removal of the keystone from the mould allows the mould to be disassembled and then removed from the shell. This allows the shell to be removed in a single piece.

In a further embodiment, the mould comprises an extension section. The extension section can be fitted to the mould and allows a taller mirror shell to be produced. This ability to fit an extension section means that an existing mould can be extended to form a larger mirror shell. There is no need to manufacture the whole mould again. Any grooves provided on the existing mould can be filled with loose tooling fixtures if desired when an extension section is added to the mould.

In a further embodiment, the mirror shell is formed using two moulds, a first mould and a second mould, wherein the first mould is provided to form a lower part of the shell and the second mould is used to form an upper part of the shell, the upper and lower parts of the shell being joinable to form a single shell. Using this arrangement, the first mould can be used to mould either an entire mirror shell or a lower part of a taller mirror and the second mould is used to form an extension part of the mirror shell such that the mirror shell formed from the first mould can be extended.

Thus, if a taller mirror is required a whole new mould does not need to be made. Instead, just a second mould is made. Any grooves to provide forming structures or edges or the like present in the first mould can be filled with removable tooling fixtures if they are not required when the first mould is used to form a section of a mirror shell. Similarly, redundant grooves can be filled with removable tooling fixtures in the second mould.

In a further aspect, the present invention provides a simulator comprising:
a thin film mirror;
a screen onto which an image is provided, said mirror being located such that a user can see the image projected onto the screen via the mirror;
and
an image generator configured to control the image provided on the screen, wherein said thin film mirror is a mirror as described above.

In many types of simulator, for example, flight simulators, the screen is a back projection screen BPS. Here, the projectors form a seamless image on the BPS. The Pilot and Co-pilot view this BPS image via the collimating mirror. The image itself is generated by an Image Generator (IG).

The present invention will now be described with reference to the following non-limiting embodiments in which.

Figure 1:
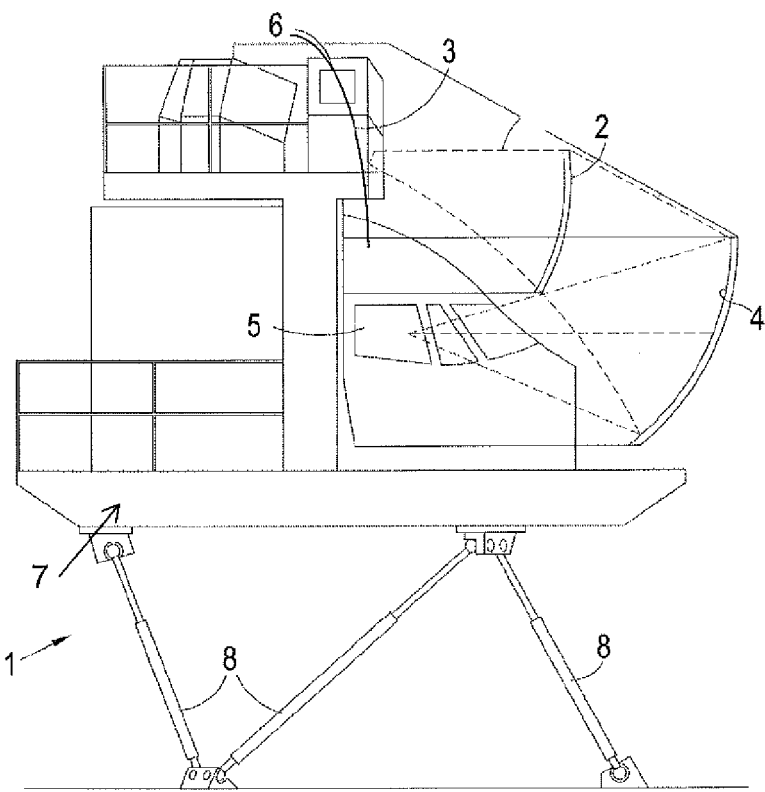
FIG. 1 is a schematic of a flight simulator using a thin film mirror in accordance with an embodiment of the present invention.
Figure 10:
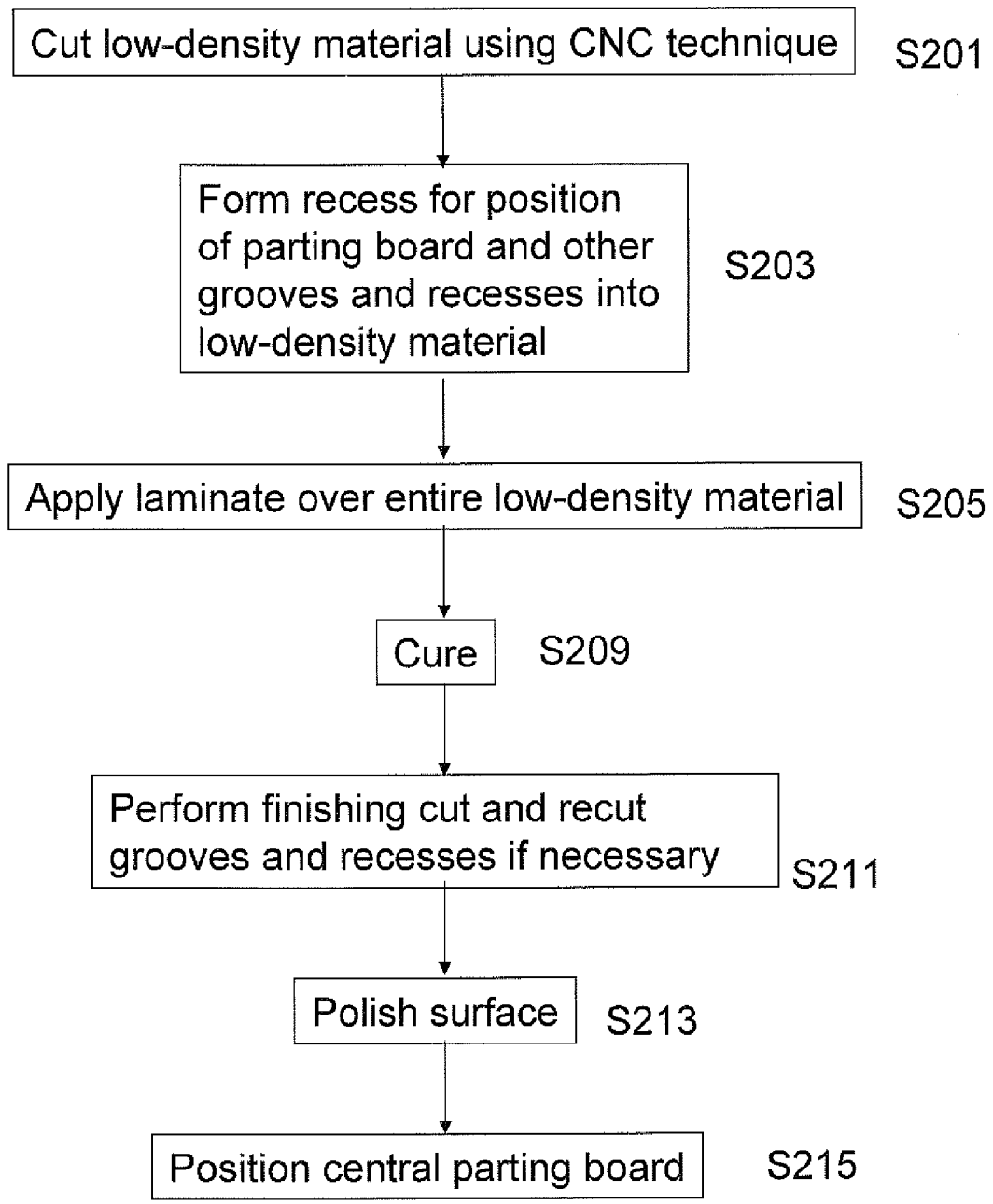
Figure 11:
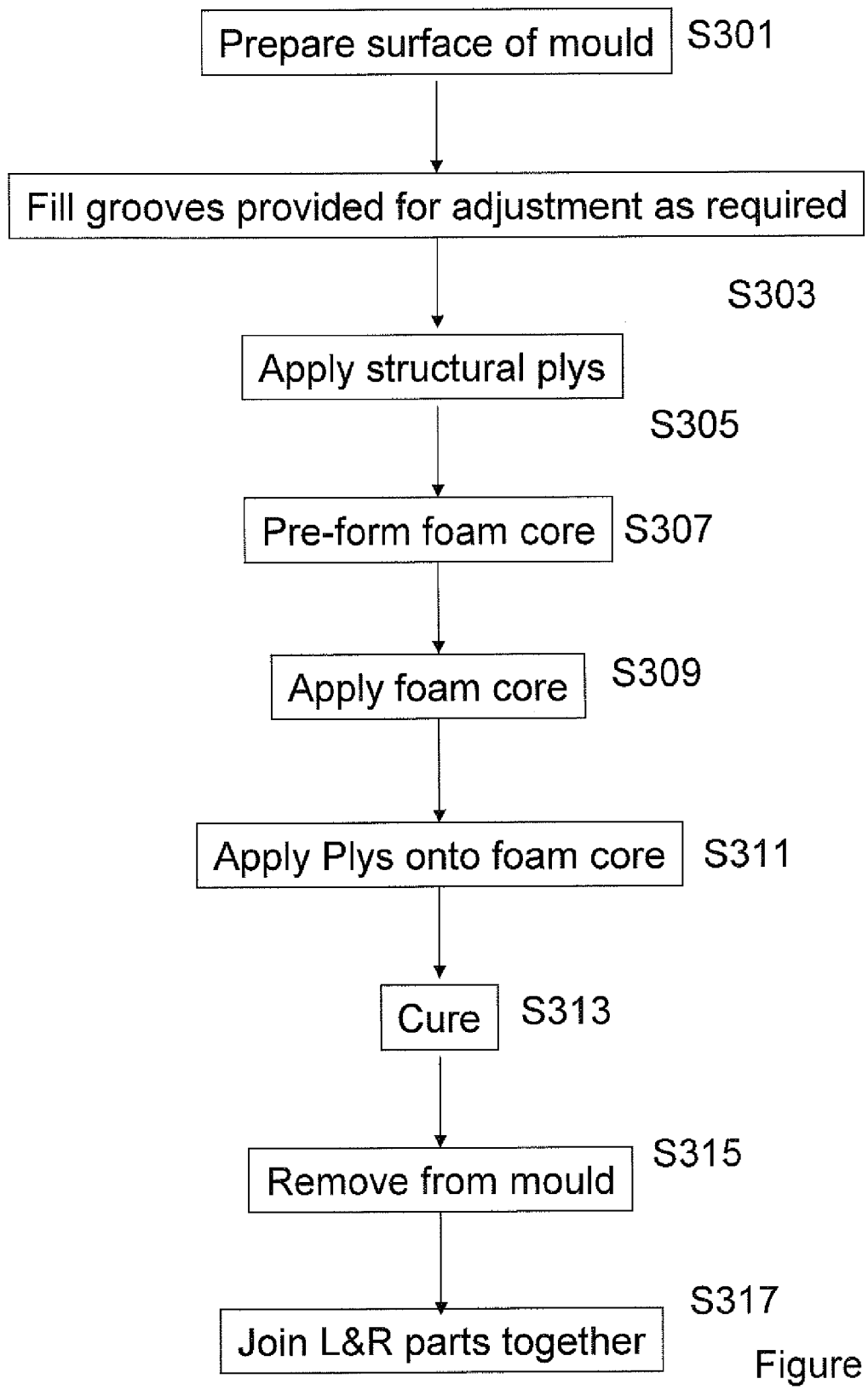
Figure 12:
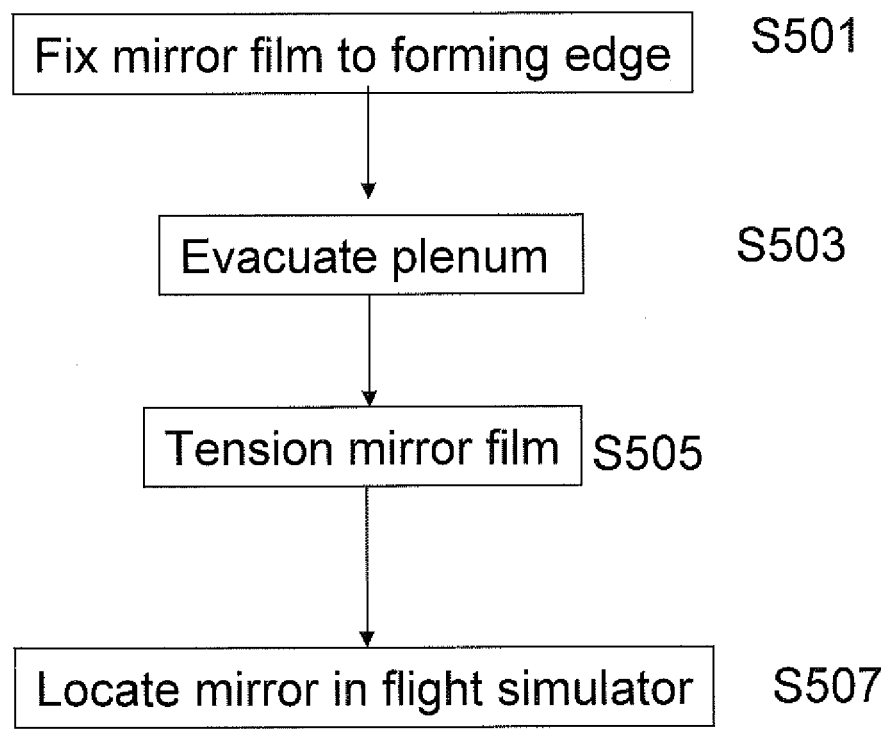

FIG. 10 a flow diagram showing a method for making a mould in accordance with an embodiment of the present invention;

FIG. 11 is a flow diagram of a method of forming a mirror shell in accordance with an embodiment of the present invention;

FIG. 12 is a flow diagram showing the basic steps of assembling the mirror shell and reflective film;

FIG. 13a is a cross section of a thin film mirror, FIG. 13(b) is a cross section of a thin film mirror with a tensioning mechanism known from the prior art; and FIG. 13(c) is cross section of a thin film mirror having a tensioning mechanism in accordance with an embodiment of the present invention;

FIG. 1 is a schematic of a flight simulator with an out of the window (OTW) visual display system (VDS). The flight simulator 1 is provided on a platform 7. The platform 7 is movable on hydraulic or electrical actuators 8.

The flight simulator comprises a replica of an aircraft cockpit 6. The aircraft cockpit 6 has windows 5. A mirror 4 wraps round the windows 5 of the aircraft cockpit 6, such that a pilot under training inside the cockpit 6 can only see the mirror 4 through the cockpit windows 5. A projection means 3 located above the cockpit is provided to project an image onto a back projection screen (BPS) 2. The BPS is positioned above the cockpit windows 5. BPS 2 and mirror 4 are located such that a pilot in the cockpit can see the image projected on the BPS 2 via mirror 4. The mirror 4 shows a representation of what the pilot would see if he were actually flying a plane.

Figure 2:
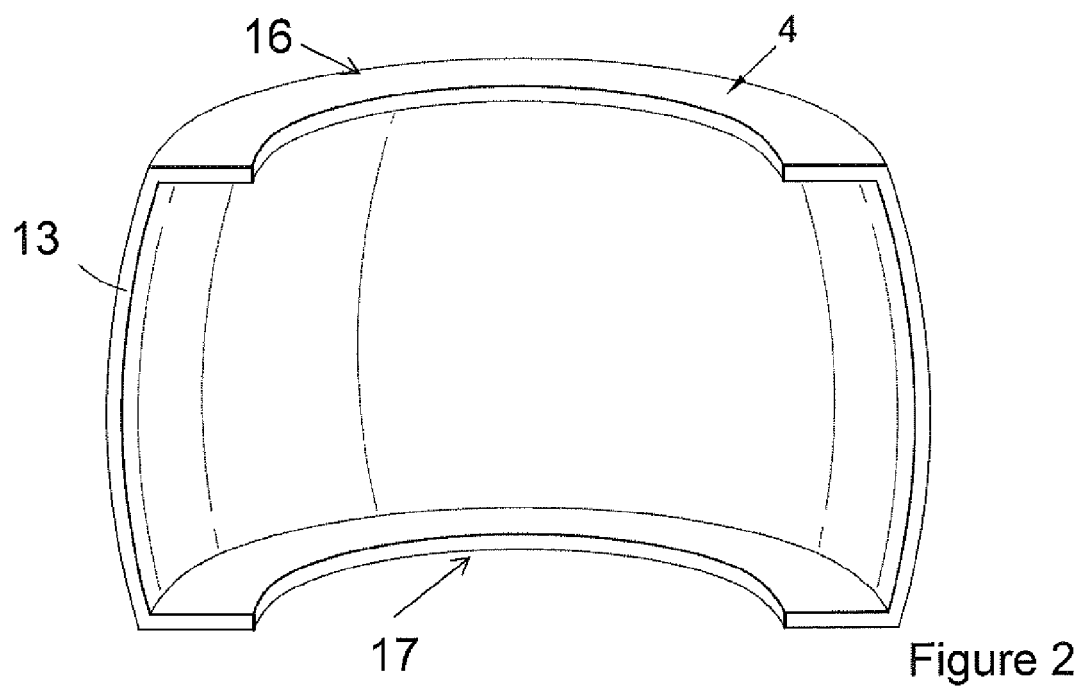
FIG. 2 is a schematic of a shell of a thin film mirror.

The mirror 4 is a thin film mirror which comprises a thin reflective film fixed to the edges of a mirror shell. The then reflective film is typically boPET. FIG. 2 is a schematic of a section of a mirror shell 13. The mirror shell 13 has an upper edge 16 and a lower edge 17. FIG. 2 shows the upper 16 and lower 17 edges projecting inwards. The edges of the side of the shell 13 will also project inwards, but these are not shown here for clarity reasons. The reflective film will be attached to the edges which project inwards. For clarity reasons, the reflective film is not shown in FIG. 2.

The space between reflective film and the shell 13 is enclosed by these two structures and is referred to as the plenum. The plenum can be at least partially evacuated. Under partial evacuation, the reflective film (not shown) is sucked towards the mirror shell 13 to achieve a substantially spherical or toroidal profile. The vacuum applied to the reflective film, and the profile of the reflective film is controlled by a closed loop vacuum control system. These are known in the art and will not be discussed further here.

Figure 3:
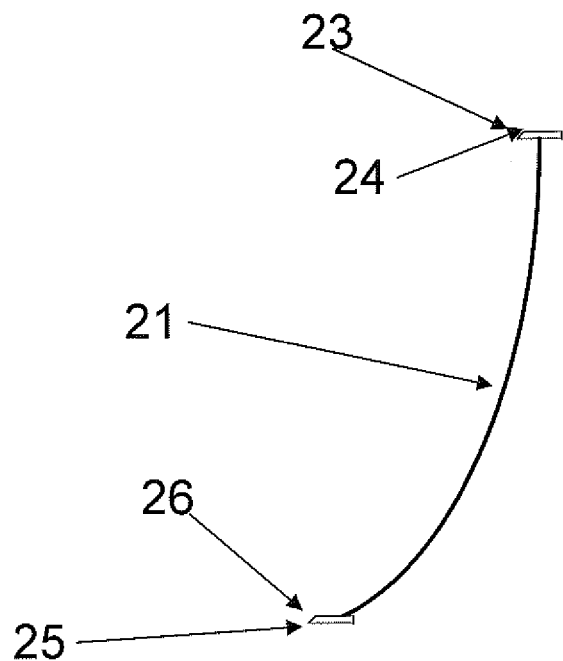
FIG. 3 is a cross-section of a known thin film mirror.

FIG. 3 shows a cross-section of a known type of mirror shell 21 which is formed using a female mould. The mirror shell 21 has a curved inner surface which, in an embodiment, is substantially spherical or toroidal. It should be noted that the figure is not to scale and no conclusions should be drawn from the profile of the cross-section as to the curvature of the shell.

An upper metal member 23 which has a well defined edge 24 will extend along the top of the shell. A lower metal member 25 which also has a well defined edge 26 will extend along the bottom edge of the shell 21. The upper 24 and lower 26 edges will project inwards from the concave inner surface of the mirror shell 21. As this is a cross-section, only the upper 23 and lower 25 members are shown. However, lateral or side members will also be formed along the lateral edges such that there is a substantially continuous edge which extends inwards around the perimeter of the shell 21. Other materials could be used for the upper, lower and lateral/side members, for example wood or a composite could be used.

The reflective film (not shown) will be stretched between the edges which extend inwards such that the edges provide "forming edges or structures" for the film.

The upper 23 and lower 25 members are separate components to the mirror shell 21 and thus need to be mounted onto the mirror shell 21. The forming position is critical.

Providing the upper 23 and lower 25 members as separate components adds to the complexity of the manufacture and also the weight of the structure.

As an alternative, it is possible to create the forming structures or edges during the moulding process using a female mould. However, such process requires the use of extra additions to the female mould to be provided to the top and bottom of the mould. Again, this adds another layer of complexity to the moulding process and also rather limits the positions where the forming edges structures may be placed.

Figure 4:
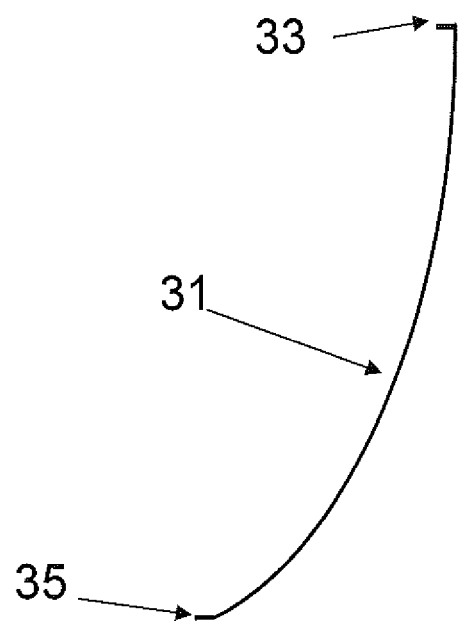
FIG. 4 is a cross-section of a known thin film mirror.

Such a structure is shown in FIG. 4 where the shell 31 is provided with an upper forming edge 33 which protrudes inwards and a lower forming edge 35 which protrudes inwards. Again, as for FIG. 3, the forming edges extend around the whole perimeter of the shell. However, the forming edges or structures may be spaced in from the edges of the shell and may not exactly follow the edges of the shell.

Figure 5:
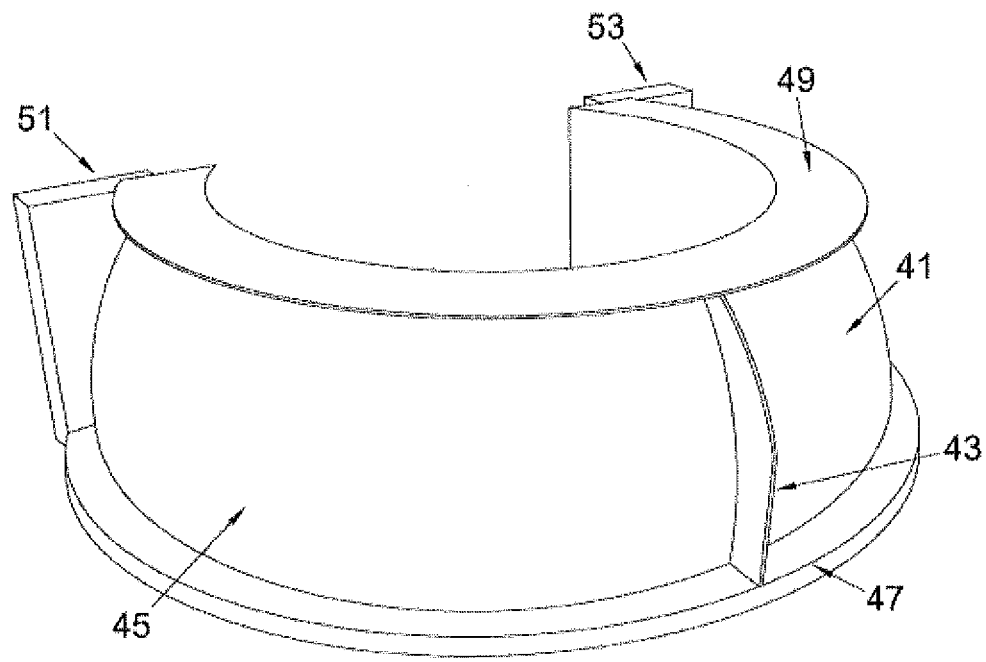
FIG. 5 is a schematic of a mould used to produce a mirror in accordance with an embodiment of the present invention.

FIG. 5 is a schematic of a mould which is used to make a mirror in accordance with an embodiment of the present invention. FIG. 5 shows a male mould 41 which is different to the female moulds previously used for such mirrors. The male mould 41 has two sections each of which have a surface with a substantially spherical or toroidal profile. When used, the mirror shell will be moulded using the substantially spherical or toroidal surfaces 45. Substantially spherical or toroidal surfaces 45 are divided into two sections by parting board 43, this is to aid removal of the sections from the mould after the moulding process is complete. The mould has a lower flange 47 and an upper flange 49. Terminating flanges 51 and 53 are provided at the ends of said mould.

By using a male mould, the inner surface of the mirror shell will be the surface which lies against the surface of the male mould 41. Such that the inner surface of the mirror shell is the "A" surface and the outer convex surface is the "B" surface. This means that the inner surface of the shell will be inherently smooth and therefore will need less processing than the inner surface of mirror shells formed using a female mould.

For example, using the above technique, it is possible to colour the inner surface of the shell using a gel coat technique. In such a technique, a colour is applied using a gel coat to the "A" surface which is to be moulded and then when the structure is removed from the mould, the colour is retained on the "A" surface. To avoid spurious reflections, in one embodiment, the inner surface of the mirror is matt black.

Further, the provision of the male mould allows structures to be provided on the inner surface of the mirror shell which may even be spaced in from the edges. Thus the technique allows more flexibility than that which can be achieved using a female mould. Further, there is no need for additional/removable features or parts to be provided on the mould to form the protrusions.

Figure 6:
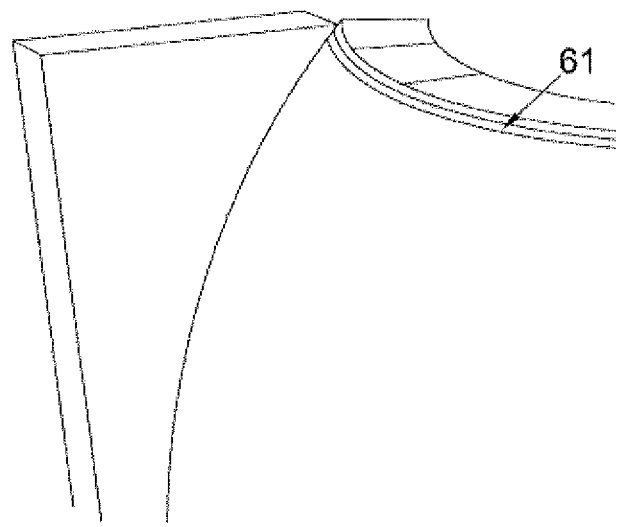
FIG. 6 shows a variation on the mould of FIG. 5.

In one embodiment, a groove or undercut 61 is provided at the top of the substantially spherical or toroidal surface as shown in FIG. 6. As groove 61 is formed in the mould 41, the groove 61 will be formed with a very high tolerance with respect to the rest of the mirror shell.

The presence of the groove 61 will result in a protrusion being formed along the edge of the shell. Thus a mirror shell 31 having the cross section shown in FIG. 4 is formed without the need to provide separate removable features or parts on the mould.

Further, there is no need to mount separate forming structures, for example as formed from a metal member explained with reference to FIG. 3.

FIG. 6 shows groove 61. In practice, groove 61 will extend along the whole edge of the substantially spherical or toroidal surface 45 i.e. the groove 61 will extend continuously along the upper edge, lower edge and side edges. This allows the forming structures or edges to be provided around the whole edge of the mirror shell.

Figure 7:
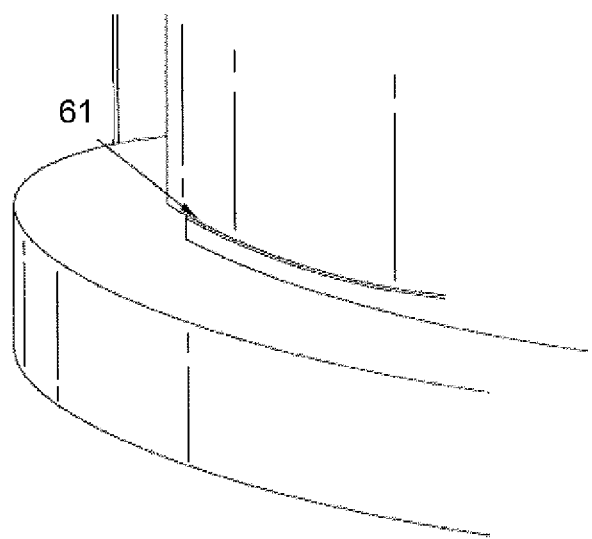
FIG. 7 shows a further variation in the mould of FIG. 5 with an undercut.

FIG. 7 shows the groove 61 extending along the lower edge.

Figure 8A:
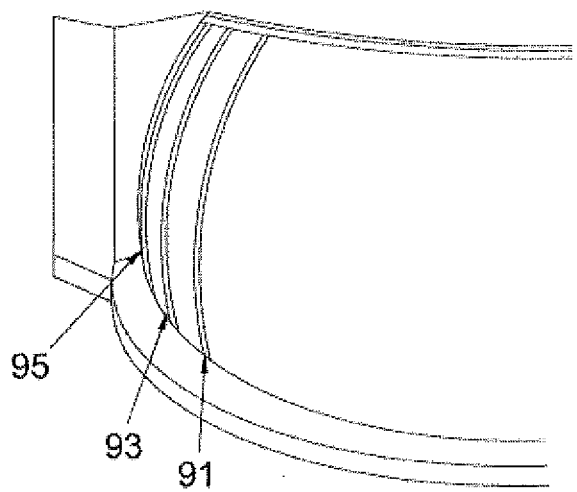
FIG. 8a shows a further variation on the mould of FIG. 5 developed for mirrors of different sizes and FIG. 8b shows a further variation in the mould of FIG. 5 developed to accommodate rectangular thin films.

The ability to provide protrusions spaced in from the edges of the mirror provides many possibilities. FIG. 8a shows a mould which can be used to mould mirrors of different sizes.

On the mould of FIG. 8a there are three grooves 91, 93 and 95 spaced in from the lateral edge of the mould. The three grooves run parallel to the lateral edge of the mould and run from the upper edge to the lower edge. The innermost groove 91 is provided furthest from the edge, then the middle groove 93 is provided closer to the lateral edge, then the outer groove 95 is provided closest to the lateral edge.

These grooves allow one mould to be formed which can produce mirrors of three different sizes. Although not shown, three similar grooves would be provided spaced in from the other lateral edge of the mould These grooves 91, 93 and 95 can be filled by a tooling fixture such as pre-cast silicone or foam formers if they are not required. A groove can then be uncovered if it is required. For example, if groove 91 is not filled, this will provide a ridge like protrusion on the edge of the inner surface of the mirror. This will abut against the thin film mirror and act as a forming structure for the thin film mirror. The position of this forming structure will define the lateral extent of the mirror. In the mould shown in FIG. 8a, uncovering groove 91 would give the smaller size mirror. If a medium size mirror was required, then groove 91 could be filled and groove 93 would be opened to form a protrusion at this point. Again, this would provide a forming structure which would again abut against the thin film mirror. If grooves 91 and 93 were filled but 95 left unfilled, then this would form a protrusion which would provide a bigger mirror than that produced by either filling groove 91 or 93.

Therefore, it is possible to make a single male mould which can be used for a plurality of mirrors with differing fields of view.

Figure 8B:
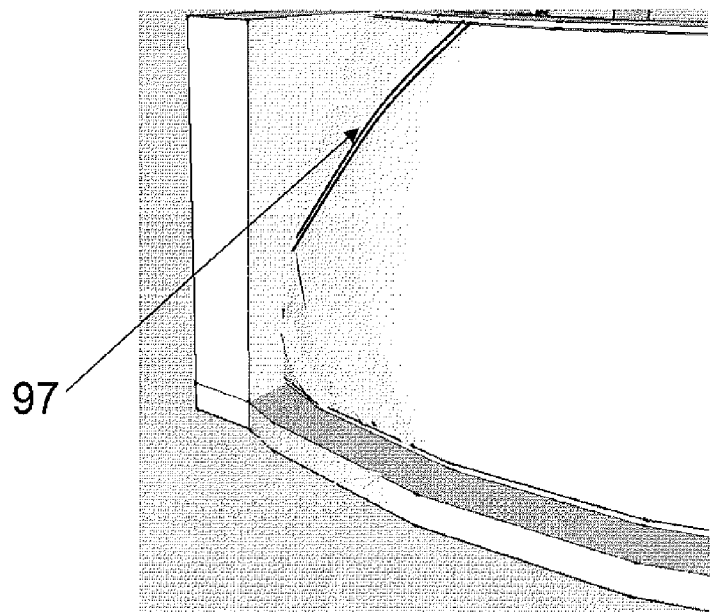

FIG. 8b, shows a mould in accordance with embodiment of the present invention having a groove which is used to provide a forming structure which will accommodate the shape of the thin film. The shape of the shell which is formed from the mould will be substantially spherical or toroidal. However, the thin-film which forms the mirror is usually provided on a roll and rectangular sheets are cut from the roll. The roll is usually not much wider than the height of the shell. Therefore, when the thin-film is attached to the mould, it does usually not extend as far as the lower corners of the shell. In this embodiment, the shell is an offset spherical section, such that the top and bottom small circles have different radii. When the finite width of film is attached it behaves like a conical lampshade with the lower corners (the lower radius small circle) having insufficient film width to cover them. To address this issue, forming structures are provided towards the edges of the shell to accommodate the shape of the film. In FIG. 8b, these forming structure appear arc-shaped, but, in practice, they are usually straight lines which cut across the corners. The mould shown in FIG. 8b allows these forming structures to be provided during the moulding process by forming groove 97 on the mould.

Typically, the mirror will subtend more than 180°. Therefore, it is difficult if not impossible to remove the mirror shell from the mould. The mould is formed to allow two mirror shell sections a left mirror section and a right mirror section (L and R) to be provided by the mould.

Figure 9:
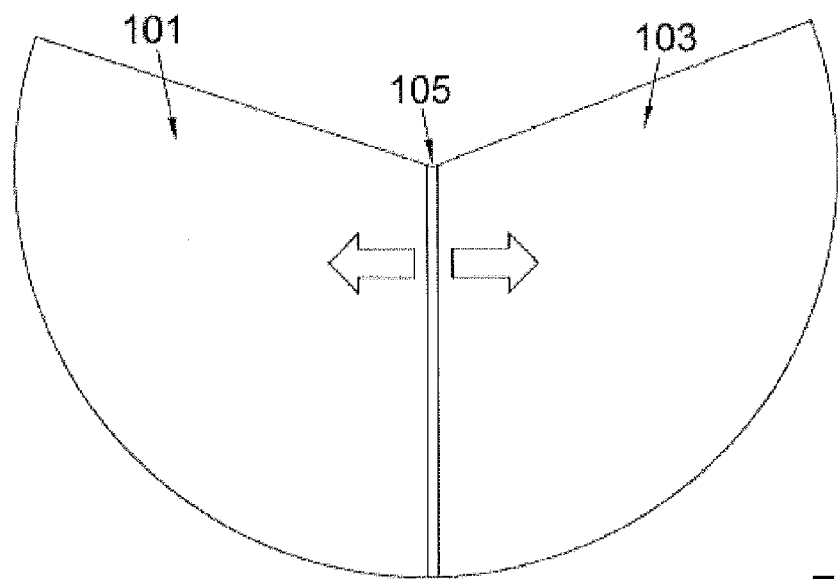
FIG. 9 is a cross-section of the mould of FIG. 5 demonstrating that the mirror shell may be formed in two sections.

This is shown in FIG. 9 which shows a cross-section of the mould with a left section 101 and a right section 103. The left section 101 is used for forming one section of the mirror shell and the right section 103 for forming the other section. As the mould tends to be positioned upside down with respect to the eventual orientation of the mirror, the left section 101 of the mould will usually form the right section of the shell and the right section 103 of the mould will usually form the left section of the mirror shell. The two mirror sections can be separately removed from the mould and then joined together.

Next, a method of forming the mould shown in FIG. 5 will be discussed in relation to FIG. 10. The mould is formed by a direct tooling method.

First, to form the basis of the mould, a low-density materials such as expanded polystyrene (EPS) is cut to the basic form using a computer numerical control cutting tool which can cut the shape exactly as required in step S201. This forms a low density tooling block. It will be machined such that its surface lies below that of the final tool.

In step S203, any recesses or grooves which will need to appear on the final mould are machined at this stage into the low-density material. For example, the grooves which provide the forming edges/structures and the grooves which allow the mould to produce mirrors of different sizes may be positioned as grooves in the low-density tooling block at this stage.

Layers of composite are then built up over the low-density tool in step S205. The layers are built up to a thickness such that they can be machined back to achieve the shape of the final tool.

The layers are then cured in step S209. A finishing cut is then performed to cut back the surface of the tool to that of the desired mould shape. The recesses and grooves in step S203 are then re-cut at this stage.

The surface is polished in step S213. The central parting board will then be positioned in step S215 in the machined groove formed for the parting board recess.

In a further embodiment, (not shown) the mould will comprise a keystone which can be removed from the mould.

Such a mould will essentially be in three or more parts with a keystone forming the central part. Removal of the keystone will allow the outer two parts of the mould to be moved together to allow release of the shell. This type of mould would allow a shell which subtends more than 180° to be formed in a single part.

In a yet further embodiment (not shown) the mould has an extension section. This extension section is provided on the bottom of the mould of FIG. 5 and allows a taller shell to be moulded. By provided an extension section, it is not necessary to form a completely new mould when a taller mirror is required. Instead, an extension section can be provided onto the existing mould. Any grooves or recesses formed in the existing mould can be filled with tooling fixtures if they are not required when the extension section is added to the mould.

In a yet further embodiment two separate moulds are provided for forming the mirror shell. The moulds are used to produce an upper mirror section and a lower mirror section and the two mirror sections are joined together after moulding. One mould can be a mould of the type described with reference to FIG. 5 and the other mould can be a mould for an extension piece of a mirror shell. For example, if a mirror shell is required which is taller than that which can be formed by the mould of FIG. 5, one part of the mirror can be made using the existing mould of FIG. 5 and an extension part to the mirror shell can be made using a further new mould. Typically, the new mould which is used for the extension piece will be smaller than the other mould used to form the shell.

Thus, if a taller mirror is required a whole new mould does not need to be made. Instead, just a second mould is made. Any grooves to provide forming structures or edges or the like present in the first mould can be filled with removable tooling fixtures if they are not required when the first mould is used to form a section of a mirror shell. Similarly, redundant grooves can be filled with removable tooling fixtures in the mould used for the extension part of the shell.

With reference to FIG. 8*b*, a forming structure was discussed which accommodated a film of a finite width. If a shell made from the mould of FIG. 5 is to be extended, then a second groove in addition to groove 97 would be needed provided (further in from the corner) for the extended height mirror because the rectangular film is biased upwards if an extension section is added to the original shell. Thus, if it is known when forming the mould of FIG. 5 that it can be used as a mould for an entire shell or a mould for part of a shell, then grooves can be added to the mould to accommodate a film of finite width for different heights of the mirror.

FIG. 11 is a flow chart showing steps of forming a mirror shell in accordance with an embodiment of the present invention. In step S301, the surface of the mould is prepared Next, in step S303, the grooves provided for adjustment as explained (if any) with reference to FIG. 8 are filled as required. This will depend on the size of the mirror. These can be filled with removable tooling fixtures which may be formed from precast silicone or foam formers.

Next, plys will be applied to the mould in step S305. In this particular embodiment, quadraxial glass is used. The composite will be applied in a laminated structure. Additional layers of biaxial glass composite are provided in all corners linking to the flanges.

In order to reduce the weight of the section, in an embodiment, a structural foam core composite will be used. One type of foam core is shaped via heating to curve to the shape of the mould. The mould is curved in two directions of curvature, this is difficult to achieve with a foam core.

However, a thermoformable structural foam core, that softens when heated and regains rigidity when cooled, can be moulded and pre-shaped via heat in step S307, to address this issue. Examples of such a thermoformable structural foam core are a cross linked PVC or SAN type foam, which can be heat formed to match the contours of the mould tool and pre-shaped in step S307.

The foam core will be laid on top of the plys in step S309. Further plys will then be placed on top of the foam core in step S311.

The structure will then be cured and removed from the mould in step S315. The left and right parts of the shell will then be joined in step S317.

FIG. 12 is a flow diagram showing how the mirror is formed once the shell has been constructed. First, the reflective film is attached between the forming edges or structures in step S501. In practice, the reflective film is usually fixed to the top forming structure, pulled tight to the bottom forming structure and then tensioned to the forming structures at the sides. The film is pulled so that it has a flat profile and that it forms a sealed chamber between the film and the shell.

Next, the plenum is at least partially evacuated in step S503. Under the partial vacuum, the reflective film is pulled back towards the shell so that the profile of the reflective film is substantially spherical or toroidal.

Figure 13:
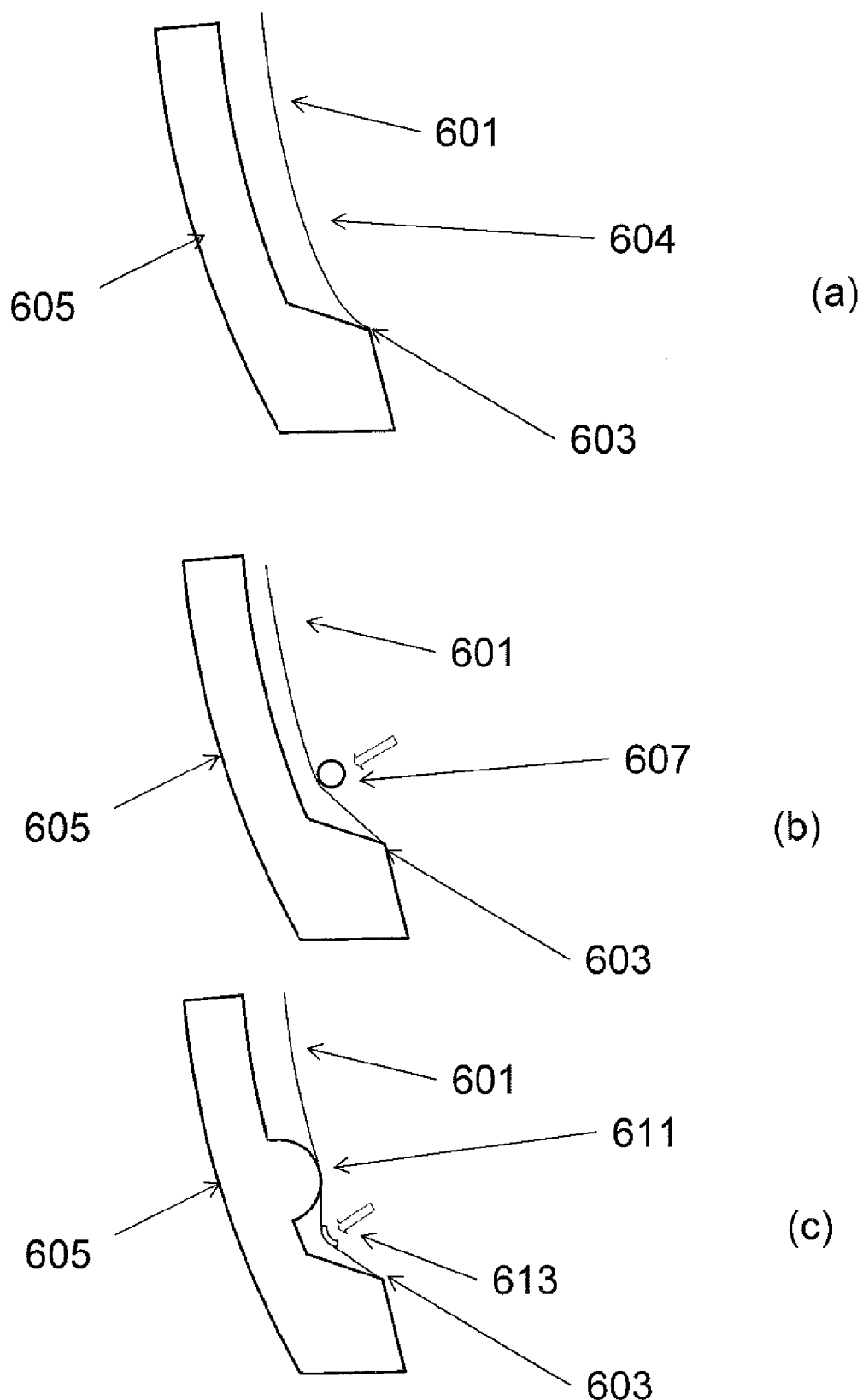

It has been found that this arrangement, while giving a good quality mirror over much of the surface, produces a mirror which is prone to distortion at the edges. FIG. 13(*a*) shows a schematic cross-section of the edge of such a mirror. The reflective film 601 is attached to the edge 603 of mirror shell 605. In the region 604, the film is stretched and distorted so that it does not achieve the desired profile.

To improve the distortion, an arrangement of the type shown with reference to FIG. 13(*b*) is used where the reflective film 601 which is connected to the edge 603 of the mirror shell 605 is tensioned by a tensioning means 607. The tensioning means is a spline 607 which is shown in cross-section which is forced against the reflective film 601. The spline will often have many arms (not shown) which apply pressure to the spline so that the tension supplied by spline 607 may be tuned.

Thus, the mirror is tensioned using this technique in step S505 and then located in the simulator in step S507.

In a further embodiment, a tensioning means which is added after the film has been attached to the shell is not used. Here, lateral tension is applied to the film as part of the process. The process applies lateral tension when the film is first applied to the shell, i.e. before it is finally or permanently attached. The film is progressively laterally tensioned until the required shape is achieved and attached to the shell.

FIG. 13(*c*) shows a tensioning mechanism which may be used in accordance with an embodiment of the present invention. Here, the reflective film 601 is mounted on a forming structure 603 of the mirror shell 605. However, here, a protrusion 611 is provided along the inside of the internal surface of mirror shell 605. A tensioning means 613 is then tensioned below the level of the protrusion 611 to pull the skin past protrusion 611.

The tensioning means 613 provides a force perpendicular to the film 601 in the region between the protrusion 611 and the forming edge 603. However, this perpendicular force serves to pull the film across protrusion 611 therefore providing a lateral force to the reflective film 601 beyond the protrusion 611.

In a further embodiment (not shown), the protrusion 611 is present without the tensioning means 613. The protrusion 611 will still serve to prevent festooning or waviness at the edges of the film from entering the central region of the film. Here, the film 601 would still contact the protrusion 611.

FIG. 13(c) shows a cross section. In the full structure, the protrusion 611 will extend spaced in from the edges of the mirror shell. In one embodiment, the protrusion 611 forms a continuous boundary to the central region of the mirror film. However, in other embodiments, the protrusion 611 is not continuous. For example, the protrusion may follow a line which is generally spaced in from the edges of the mirror shell, but the protrusion may not be continuous along this line. In further embodiments, the protrusion 611, follows a line spaced in from the top and bottom edges, but does not extend along the side edges.

The invention claimed is:

1. A thin film mirror, comprising:
a mirror shell;
a reflective film stretched between forming structures provided on said mirror shell and reflective film being arranged such that they form a chamber which is capable of being placed under at least partial vacuum;
the mirror shell having an inner surface which forms an inner wall of said chamber, wherein the mirror shell is a moulded part where its inner surface is a controlled surface.

2. A thin film mirror according to claim 1, wherein the inner surface has at least one protrusion formed integral with the mirror shell during its moulding.

3. A thin film mirror according to claim 2, wherein the protrusion provides at least one of the forming structures.

4. A thin film mirror according to claim 1, wherein the mirror shell has the shape of a section of a substantially spherical shell or toroid.

5. A thin film mirror according to claim 1, wherein the mirror shell has an upper edge part and a lower edge part, the upper and lower edge parts being formed along small circles, said small circles being formed in planes which are parallel to one another.

6. A thin film mirror according to claim 4, wherein the mirror shell subtends through an angle of at least 180°.

7. A thin film mirror according to claim 6, wherein the mirror shell comprises two sections joined together, wherein each section subtends through an angle of 180° or less.

8. A thin film mirror according to claim 1, wherein the mirror shell comprises two sections, where one section is provided on top of the other section.

9. A thin film mirror according to claim 1, further comprising at least one protrusion on its inner surface, said protrusion providing a forming structure for said reflective film which defines the lateral extent of the mirror, said forming structure being provided spaced in from a lateral edge of the mirror.

10. A thin film mirror according to claim 1, further comprising a protrusion in the form of a ridge which is separated from the edges of the mirror, said ridge providing a secondary forming structure for said reflective film, said secondary forming structure being provided spaced apart from an edge of the mirror shell with a forming structure, said secondary forming structure contacting said reflective film.

11. A thin film mirror according to claim 10, further comprising a tensioning mechanism configured to provide a force on a section of reflective material between the secondary forming structure and a forming structure at the nearest edge of the mirror to the secondary forming structure.

12. A thin film mirror according to claim 1, wherein said mirror shell comprises a composite material.

13. A thin film mirror according to claim 12, wherein said mirror shell comprises a composite with a foam core.

14. A thin film mirror, comprising:
a mirror shell;
a reflective film stretched between forming structures provided on said mirror shell and reflective film being arranged such that they form a chamber which is capable of being placed under at least partial vacuum;
the mirror shell having an inner surface which forms an inner wall of said chamber, wherein the mirror shell is a moulded part where its inner surface comprises one or more protrusions spaced in from an edge of said mirror shell.

15. A simulator comprising:
a thin film mirror;
a screen onto which an image is provided, said mirror being located such that a user sees the image projected onto the screen via the mirror; and
an image generator configured to control the image provided on the screen, wherein said thin film mirror is a mirror according to claim 1.

16. A method of making a thin film mirror, said method comprising:
forming a mirror shell;
fixing a reflective film to said mirror shell, such that a chamber is formed between said reflective film and mirror shell, said chamber being capable of being placed under vacuum,
wherein forming said mirror shell comprises moulding said mirror shell using a male mould.

17. A method according to claim 16, wherein said male mould has a part which is a substantially spherical section.

18. A method according to claim 16, further comprising forming said mould.

19. A method according to claim 18, wherein the mould is formed with at least one groove, such that at least one forming structure is formed on a surface of said mirror shell which is adjacent said mould.

20. A method according to claim 19, wherein a groove is formed in said mould which is spaced apart from the edge of said mould, such that a secondary forming structure is provided on said mirror shell, said secondary forming structure being spaced apart from the edge of said mirror shell, such that the reflective film contacts the secondary forming structure.

21. A method according to claim 18, wherein a plurality of grooves are formed in the mould, said grooves being positioned at different lateral positions of the mould.

22. A method according to claim 21, further filling one or more of the grooves such that the innermost unfilled groove defines the lateral extent of the mirror to be formed.

* * * * *